United States Patent
Tomiser, Jr. et al.

(10) Patent No.: US 6,510,618 B2
(45) Date of Patent: Jan. 28, 2003

(54) ANGLE GAGE

(75) Inventors: Frank J. Tomiser, Jr., St. Louis, MO (US); Kiyoshi Hoshino, Chesterfield, MO (US)

(73) Assignee: Emerson Electric Co., St. Louis, MO (US)

( * ) Notice: Subject to any disclaimer, the term of this patent is extended or adjusted under 35 U.S.C. 154(b) by 53 days.

(21) Appl. No.: 09/760,606

(22) Filed: Jan. 16, 2001

(65) Prior Publication Data

US 2002/0133961 A1 Sep. 26, 2002

(51) Int. Cl.[7] .......................... G01B 3/56; B23Q 17/22; B27G 23/00
(52) U.S. Cl. .............................. 33/534; 33/640
(58) Field of Search .................... 33/534, 114, 474, 33/476, 478, 481, 482, 501.05, 501.08, 501.09, 501.45, 535, 613, 626, 628, 640, 567

(56) References Cited

U.S. PATENT DOCUMENTS

| | | | |
|---|---|---|---|
| 2,607,121 A | 8/1952 | Wiedebusch | 33/455 |
| 4,097,999 A | 7/1978 | Nowlin | |
| 4,267,642 A | 5/1981 | Stapleford | 33/473 |
| 4,328,619 A | 5/1982 | Lefevre et al. | |
| 4,376,341 A | 3/1983 | Lombardo | |
| 4,459,748 A | 7/1984 | Byrum | 33/1 N |
| 4,497,117 A | 2/1985 | Wrobley et al. | 33/276 |
| 4,744,152 A | 5/1988 | Roach et al. | 33/471 |
| 4,779,354 A * | 10/1988 | Hill | 33/640 |
| 4,798,005 A | 1/1989 | Lowell | 33/386 |
| 4,862,593 A | 9/1989 | Petrovich | 33/202 |
| 4,897,926 A | 2/1990 | Altnether et al. | 33/203.14 |
| 4,945,649 A | 8/1990 | Parker | 33/534 |
| D312,796 S | 12/1990 | Parker | D10/61 |
| 4,976,046 A * | 12/1990 | Lee et al. | 33/640 |
| 5,040,443 A | 8/1991 | Price | 83/468 |
| 5,121,553 A * | 6/1992 | Boerder | 33/640 |
| 5,133,135 A | 7/1992 | Durfee, Jr. | 33/534 |
| 5,201,130 A * | 4/1993 | Krchnak | 33/613 |
| 5,361,508 A | 11/1994 | Ruggiero | 33/527 |
| 5,402,701 A | 4/1995 | Ingram | 83/421 |
| 5,407,022 A | 4/1995 | Scott et al. | 175/331 |
| 5,410,816 A | 5/1995 | Ruggiero | 33/527 |
| 5,457,891 A | 10/1995 | Taylor | 33/512 |
| 5,491,906 A * | 2/1996 | Reilly | 33/640 |
| 5,586,395 A | 12/1996 | Malczewski | 33/471 |
| 5,714,686 A | 2/1998 | Penjaska | 73/432.1 |
| 6,055,737 A | 5/2000 | Sweaney | 33/534 |
| D426,474 S | 6/2000 | Chang | D10/65 |
| 6,076,270 A | 6/2000 | Figliuzzi | 33/452 |

OTHER PUBLICATIONS

Sears *Owners Manual* Model No. 171.25468 "Craftsman® Guide Master™ Router Table Push Shoe"; 10/95 (10 pgs.).
Sears *Owner Manual* Model No. 171.323711 "Craftsman® Fence Guide System"; 02/99 (10 pgs.).
Copy of box for "Frence Guide System" (4 pgs.) (Date unknown).
Sears Craftsman® Guide Master™ Table Saw Push Shoe; ⁹32190; 08/99 (2 pgs.).
Sears Craftsman® Guide Master™ Circular/Sabre Saw Guide; ⁹25781; 10/95 (3 pgs.).
Gramercy #A1121–12, "Adjustable Drafting Triangle" 1999 (1 pg.) (No month).

* cited by examiner

*Primary Examiner*—Christopher W. Fulton
(74) *Attorney, Agent, or Firm*—Howrey Simon Arnold & White LLP (57) ABSTRACT

A free-standing angle gage is described having a first substantially flat plate connected to a second substantially flat plate. When the angle gage is placed on the reference surface of a power tool, the sides of the first and second substantially flat plates form angles to the reference plane. By aligning an adjustable element of the power tool against one of the angled sides of the angle gage, the angle formed by the adjustable element the reference surface may be determined quickly and accurately. Also described is a method of measuring the angle formed by an adjustable element of a power tool relative to a reference plane.

57 Claims, 11 Drawing Sheets

ANGLE GAGE

BACKGROUND OF THE INVENTION

1. Field of the Invention

The invention relates to angle gages. More particularly, this invention relates to a free-standing angle gage that may be used to quickly and accurately determine the angle formed by an adjustable element of a power tool relative to a reference surface on the power tool. As the angle gage is free-standing, an operator's hands are free to manipulate the power tool without having to maintain contact with the angle gage.

2. Description of the Related Art

In the field of power tools, measuring angles is commonplace. With a typical power tool, an adjustable element is movably attached to a fixed reference plane. For instance, the axis of a table saw blade typically may be rotated relative to the table saw cutting table. Similarly, the fence of a jointer or planer generally may be rotated relative to its bed. The axis of a drill bit typically may be angled with respect to the table on a drill press. Further, a miter saw may be rotated relative to the miter box to produce a workpiece having angled cuts.

To produce accurate finished workpieces, it is necessary to set up the power tool using proper measurements. It is desirable to perform this set up procedure quickly yet accurately. Therefore, there has been a need for quick and accurate measurement of angles in the field of power tools.

To properly set up a given power tool, the operator should use two hands to make the adjustments. Therefore, it is also desirable for any gage used for angle measurement to be capable of standing alone. Otherwise, two operators would be needed: one to adjust the power tool and one to make the measurement with the angle gage. This increases the time and expense of producing a workpiece.

Several attempts to provide angle measurement capabilities have been made previously. For instance, it is known to use a remote scale and pointer system to determine the angles relative to a fixed reference plane. These types of scale and pointer systems tend to be relatively complex, requiring periodic maintenance and calibration. However, it has been discovered that over time, without proper attention, the accuracy and repeatability of measurements made with these scale and pointer systems decreases because the true zero location may drift. Adding to this inaccuracy is the problem of parallax involved between the pointers or cursors and the index lines of the scale.

There have been many protractor-type gages as disclosed in U.S. Pat. No. 2,607,121 to Wiedenbusch and U.S. Pat. No. 4,744,152 to Roach. However, these units are not stand-alone units that may be used by a single operator to accurately and safely set up a power tool. These units are susceptible to parallax issues as well.

Similarly, units that are capable of contacting the adjustable element of the power tool are known, such as disclosed in U.S. Des. Pat. No. 312,796. However, these types of units are not free-standing, leading to difficulty in accurately setting up a given power tool.

Thus, there is a need for an accurate gage to directly measure angles, which is relatively simple, quick, and easy to use. Further, there is a need for an angle gage that is capable of standing alone, so that it may be utilized while the operator uses two hands to manipulate the power tool.

The claimed invention is directed at overcoming, or at least minimizing, the disadvantages of the prior art.

SUMMARY OF THE INVENTION

The invention relates to a free-standing angle gage to measure the angle formed by an adjustable element of a power tool relative to a reference surface on that power tool. A free-standing angle gage is described for measuring the angle formed by an adjustable element of a power tool relative to a reference plane. This free-standing angle gage has two components in some embodiments: a first substantially flat plate and a second substantially flat plate. The first substantially flat plate may have a top surface, a bottom surface, a first side, and a second side, the top surface being parallel to the bottom surface, the first side forming a first angle with the bottom surface, the second side forming a second angle with the top surface. The first substantially flat plate may be connectable to the second substantially flat plate such that the resulting angle gage may stand alone. A selected one of the top surface and bottom surface of the first substantially flat plate may be placed on the reference surface, and a selected one of the first and the second sides of the first substantially flat plate may be placed proximate the adjustable element to determine the angle formed by the adjustable element relative to the reference surface.

In some embodiments, the second substantially flat plate has a bottom surface and a first side, the first side forming a third angle with the bottom surface of the second substantially flat plate.

In some aspects, the free-standing angle gage has surface indicia corresponding to the value of various angles, and in others it has surface indicia with an angular scale measuring from 0 degrees to 45 degrees in one degree increments.

Some embodiments, the free-standing angle gages includes the first substantially flat plate being perpendicular to the bottom surface of the first substantially flat plate, the second substantially flat plate having a second slot perpendicular to a top surface of the second substantially flat plate, the first slot mating with the second slot to interconnect the first substantially flat plate and the second substantially flat plate at a connecting angle.

In some aspects, a method of determining an angle that an formed by adjustable element of a power tool relative to a reference surface is described having the following steps: (1) providing a power tool having a reference surface and an adjustable element; (2) providing a free-standing angle gage having a first substantially flat plate having a top surface, a bottom surface, a first side, and a second side, the top surface being parallel to the bottom surface, the first side forming a first angle with the bottom surface, the second side forming a second angle with the top surface, and a second substantially flat plate having a top surface and a first side, the first side forming a third angle with the top surface of the second substantially flat plate, the first substantially flat plate being connectable to the second substantially flat plate such that the resulting angle gage may stand alone when placed on the reference surface; (3) placing the angle gage onto the reference surface of the power tool; and (4) adjusting the adjustable element until the adjustable element selectively contacts the first side of the first substantially flat plate, the second side of the first substantially flat plate, and the first side of the second substantially flat plate to determine the angle formed by the adjustable element relative to the reference surface.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

The invention relates to an angle gage to measure the angle formed by adjustable element of a power tool relative to a reference surface of a power tool. For instance, the angle gage may be used to measure the angle a table saw blade forms with a table saw, a fence forms to the bed of a jointer/planer, or a bit forms with a table on a drill press. The angle gage is designed in a way which allows the angle gage to be free-standing. In this way, one operator may set up a power tool quickly and accurately without requiring a second operator to hold the gage. Further, because the adjustable element may directly contact the angle gage, the angles are measured more accurately than with other known methods. Also, although particular common angles—22.5 degrees, 30 degrees, 45 degrees, 60 degrees, and 67.5 degrees, and 90 degrees—are used in this disclosure to describe how the angle gage may be utilized, any angle may be measured using a customized angle gage. Thus, the angle gage is versatile. In some embodiments, the two components of the angle gage (the substantially flat plates) are locked together to improve the robust nature of the gage. Also, in some embodiments, the angle gage is manufactured from two molded polymer plates which are relatively inexpensive to produce.

Finally, the surface indicia present on the substantially flat plates denote given angles and, because the angle gage relies upon direct contact between the adjustable element of the power tool and the angle gage itself, reading the angle gage presents no parallax problems thus increasing the accuracy of the angle measurement.

Illustrative embodiments of the invention are described below as they might be employed in measuring the angle formed by an adjustable element of a power tool relative to a reference surface on the power tool. In the interest of clarity, not all features of an actual implementation are described in this specification. It will of course be appreciated that in the development of any such actual embodiment, numerous implementation-specific decisions must be made to achieve the developers' specific goals which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description and drawings.

Embodiments of the invention will now be described with reference to the accompanying figures. Generally, in some embodiments, the angle gage consists of two substantially flat plates that are connected in a fashion that allows the angle gage to be free-standing. In some embodiments, the substantially flat plates are connected via slots that extend about half way through the substantially flat plates such that the substantially flat plates may be interlocked. In this way, the angle gage is free-standing.

Figure 1A:
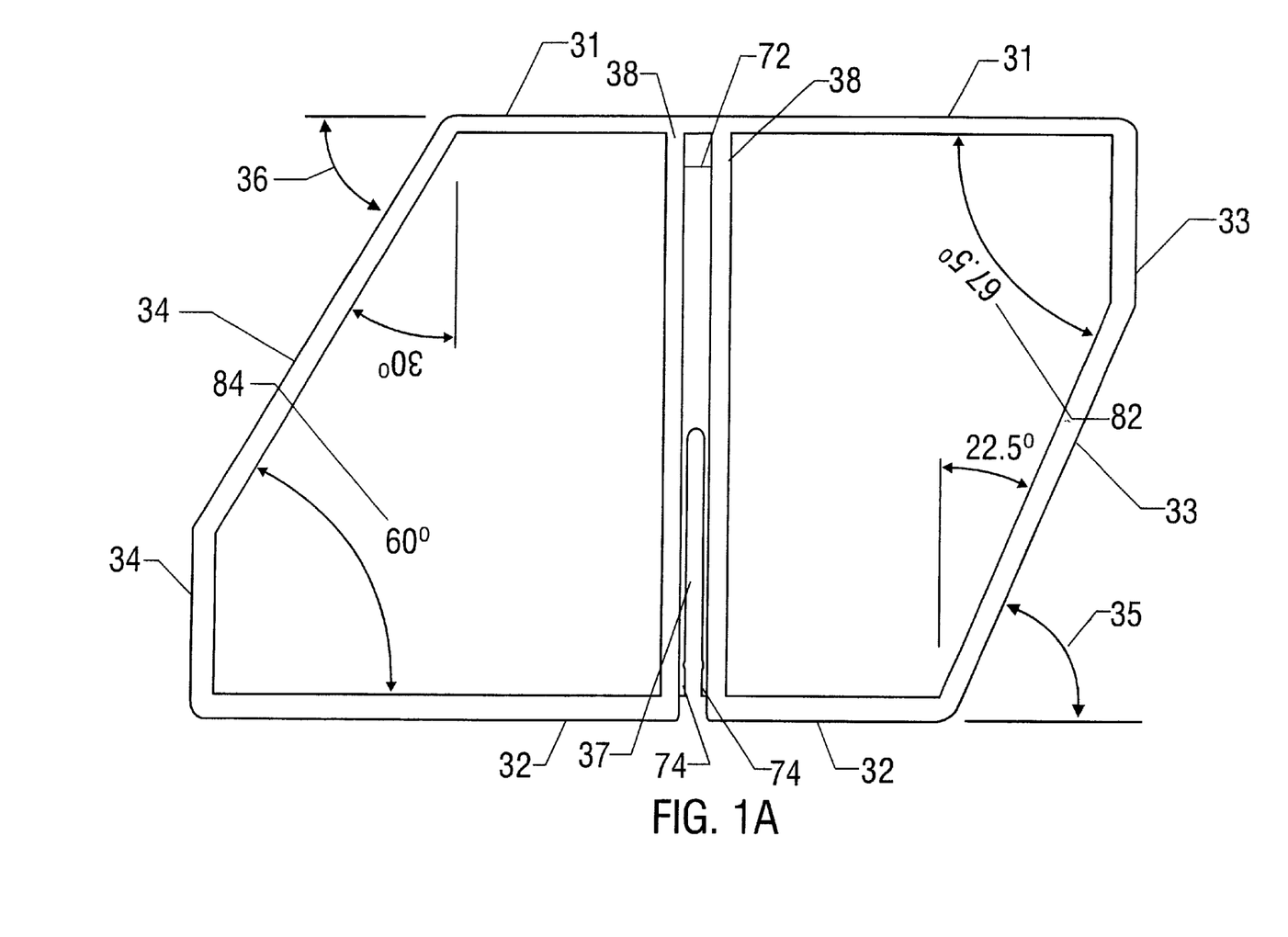
FIG. 1A is a front view of a first substantially flat plate of one embodiment of the present invention.

Referring to FIG. 1A, a first substantially flat plate 30 is shown. The first substantially flat plate 30 has a top surface 31 that is parallel to a bottom surface 32. The first substantially flat plate 30 has a first side 33 and a second side 34.

First side 33 is shown perpendicular to top surface 31 in this embodiment. First side 33 is also shown forming a first angle 35 with bottom surface 32. In the embodiment shown, first angle 35 is 67.5 degrees although any desired angle could be used. Surface indicia 82 corresponding to the value of the first angle 35 in degrees is also shown. This surface indicia 82 may be stamped, molded, embossed, written, etc. upon the first substantially flat plate 30.

Second side 34 of the first substantially flat plate 30 is shown perpendicular to the bottom surface 32 in this embodiment. Second side 34 is also shown forming a second angle 36 with top surface 31. In the embodiment shown, second angle 36 is 60 degrees, although any desired angle could be used. Surface indicia 84 corresponding to the value of the second angle 36 in degrees is also shown. This surface indicia 84 may be stamped, molded, embossed, written, etc. upon the first substantially flat plate 30.

The first slot 37 is shown in FIG. 1A as being perpendicular to the bottom surface 32 of the first substantially flat plate 30. In this embodiment, the first slot 37 extends approximately half way of the distance between the bottom surface 32 and the top surface 31 of the first substantially flat plate. Extending on either side of first slot 37, and extending from the bottom surface 32 of the first substantially flat plate to the top surface 31 of the first substantially flat plate are guides 38. In between guides 38, and adjacent the top surface 31 of the first substantially flat plate 30, is first lock 72.

Figure 1B:
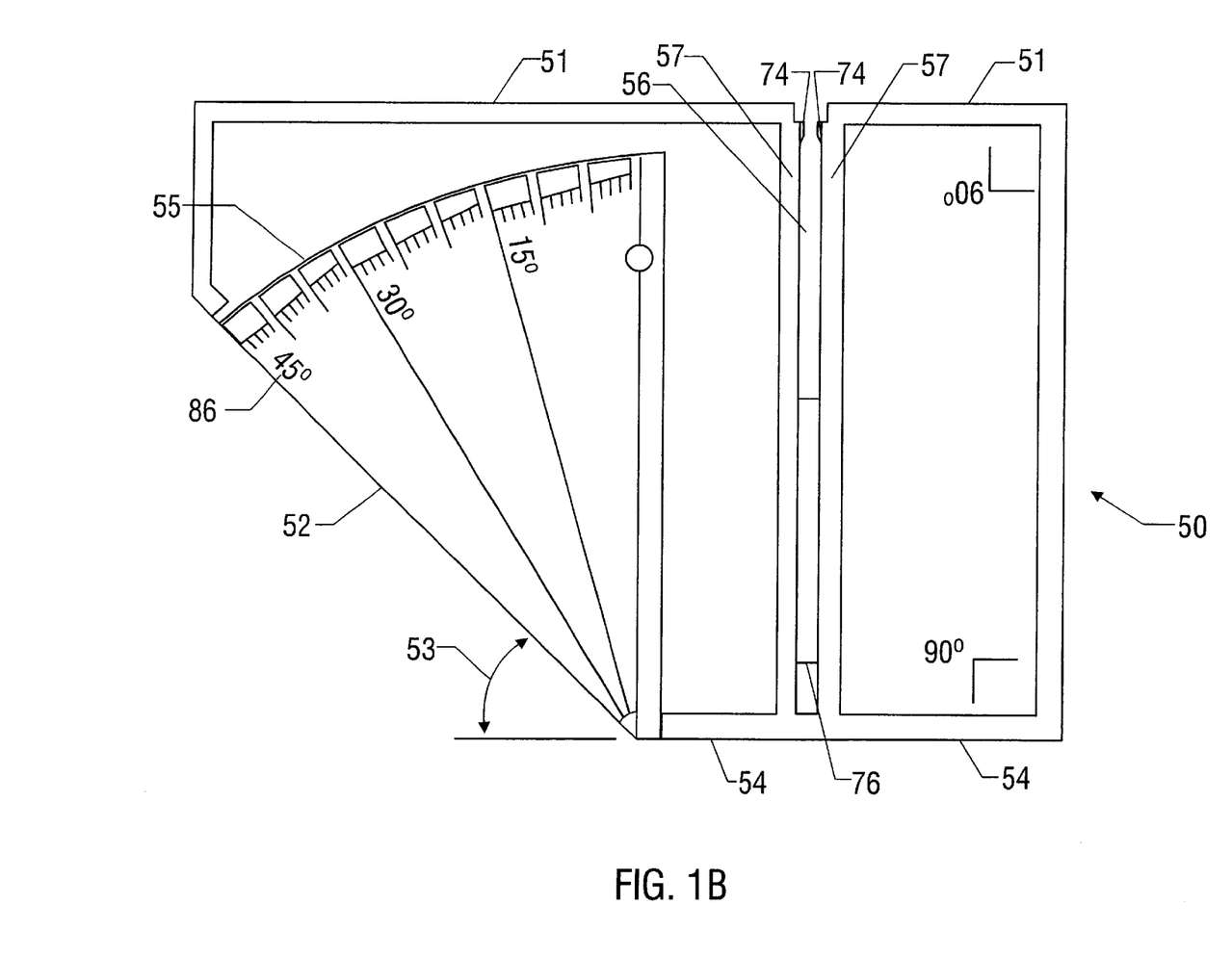
FIG. 1B is a front view of a second substantially flat plate of one embodiment of the present invention.

Referring to FIG. 1B, a second substantially flat plate 50 is shown. The second substantially flat plate 50 has a top surface 51 that is parallel to a bottom surface 54 in this embodiment. The second substantially flat plate 50 has a first side 52.

First side 52 of the second substantially flat plate 50 is shown perpendicular to top surface 51 in this embodiment. First side 52 of the second substantially flat late 50 is also shown forming a third angle 53 with bottom surface 54 of the second substantially flat plate 50. In the embodiment shown, the third angle 53 is 45 degrees although any desired angle could be used. Surface indicia 86 corresponding to the value of the third angle 53 in degrees is also shown. This surface indicia 86 may be stamped, molded, embossed, written, etc. upon the second substantially flat plate 50.

Also stamped, molded, embossed, written, etc. upon the second substantially flat plate 50 is surface indicia 55. Surface indicia 55 shown in this embodiment are accurately molded graphic of an angular scale from zero to forty-five degrees, in increments of one degree.

Also shown in FIG. 1B, the second slot 56 is perpendicular to the top surface 51 of the second substantially flat plate 50. In this embodiment, the second slot 56 extends approximately half way of the distance between the top surface 51 and the bottom surface 54 of the second substantially flat plate. Extending on either side of second slot 56, and extending from the bottom surface 54 of the second substantially flat plate 50 to the top surface 51 of the second substantially flat plate 50, are guides 57. In between guides 57, and adjacent the bottom surface 54 of the second substantially flat plate 50, is second lock 76.

In these embodiments, the substantially flat plates 30 and 50 may be molded from polymers. Alternatively, the substantially flat plates 30 and 50 could be made from any number of alternate materials including, but not limited to, embossed and formed metal sheet, die cast metals or powdered metal plates. In general, any material known to one of ordinary skill in the art having the benefit of this disclosure could be utilized.

Figure 2:
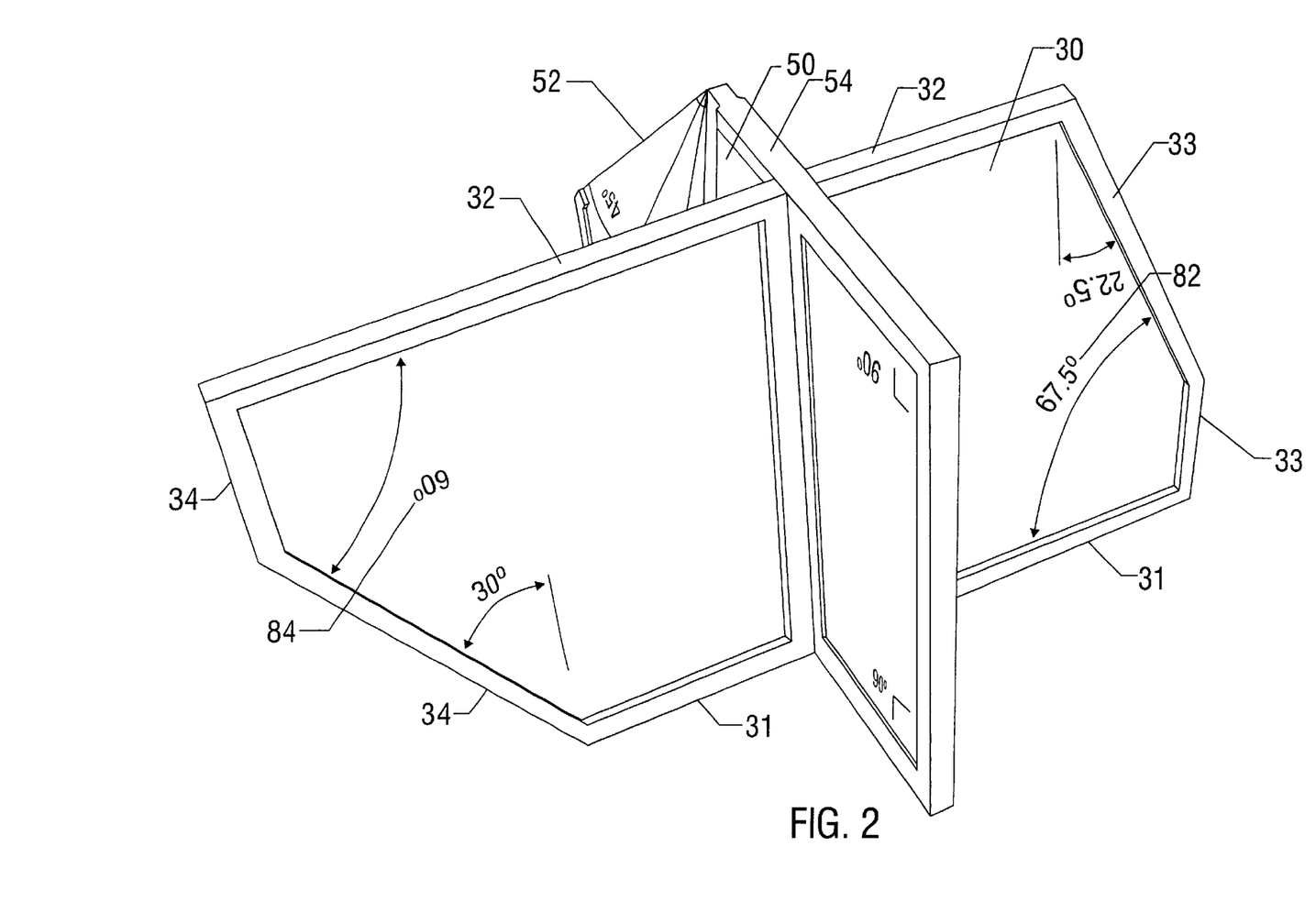
FIG. 2 is a front and top perspective view of one embodiment of the present invention.
Figure 3:
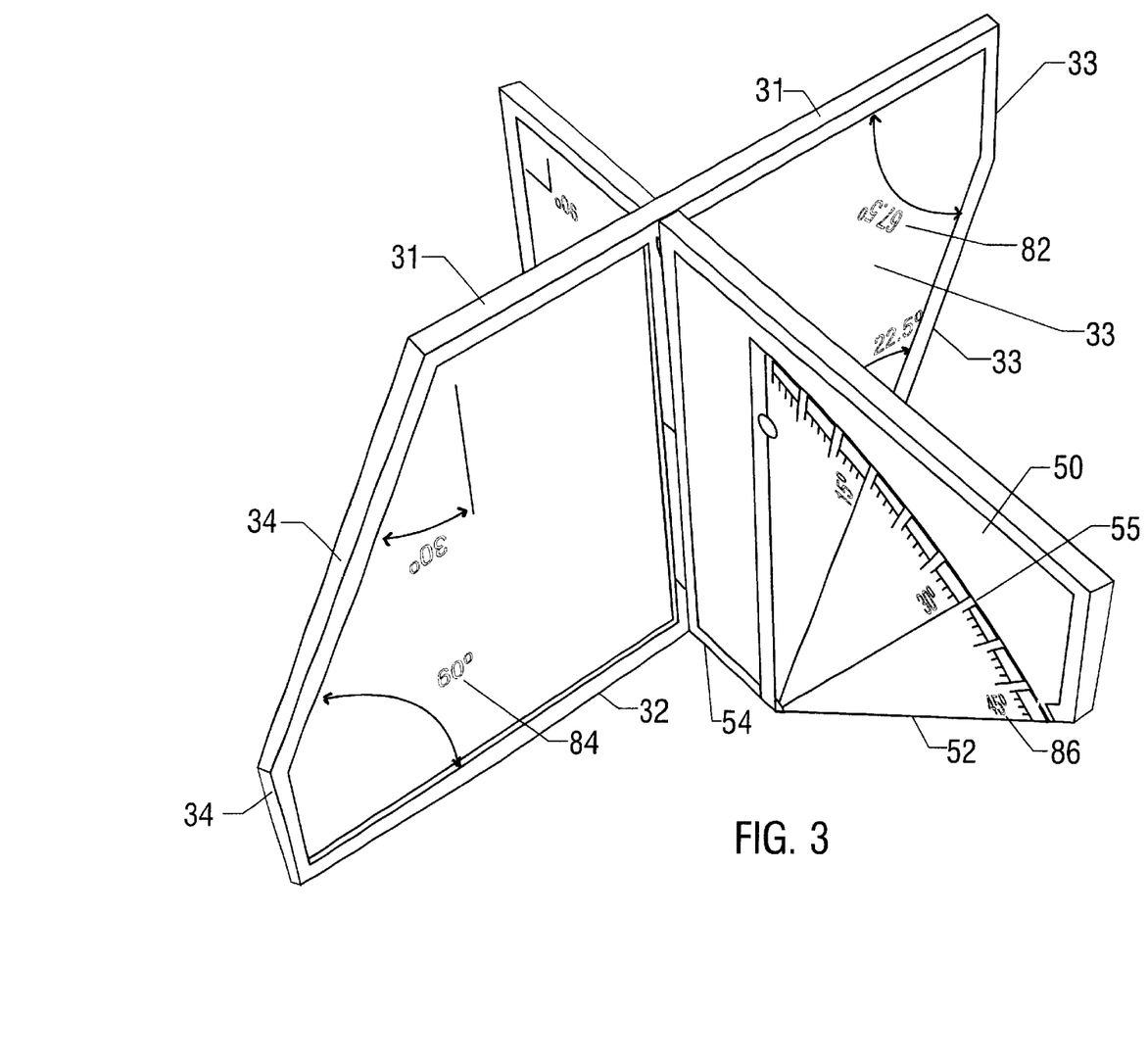
FIG. 3 is a rear and back perspective view of the present invention.

Referring to FIGS. 2 and 3, an embodiment of the present invention is shown in which the first substantially flat plate 30 is connected to the second substantially flat plate 50. In the embodiment shown, the first slot 37 is mated with the second slot 56. The guides 38 on the first substantially flat plate 30 and the guides 57 on the second substantially flat plate 50 assist in aligning the two substantially flat plates and assist in maintaining a constant connecting angle 59. In this embodiment, the connecting angle is 90 degrees, although other connecting angles would be acceptable to produce a free-standing angle gage 20.

To construct the free-standing angle gage 20 from the two substantially flat plates, the first slot 37 of the first substantially flat plate 30 is mated, at about the connecting angle 59, with the second slot 56 on the second substantially flat plate 50. Force is then applied to the top surface 31 of the first substantially flat plate 30 and to the bottom surface 54 of the second substantially flat plate 50. These forces are applied until the top surface 31 of the first substantially flat plate 30 and the top surface 51 of the second substantially flat plate 50 are approximately planar. At this point in this embodiment, the bottom surface 32 of the first flat plate 30 and the bottom surface 54 of the second flat plate 50 are also approximately in the same plane. Thus, the angle gage 20 is in its "connected" position. The free-standing angle gage may be inverted as shown in FIG. 3.

In some embodiments, a locking mechanism 70 may be employed to assist in keeping the angle gage 20 in its connected position. In the embodiment shown in FIGS. 1A, 1B, 2, and 3, the locking mechanism 70 is comprised of (1) a set of teeth 74 projecting toward each other in the first slot 37 and adjacent the bottom surface 32 of the first substantially flat plate 30; (2) a first lock 72 located between the guides 38 and adjacent the top surface 31 of the first substantially flat plate 30; (3) a set of teeth 74 projecting toward each other in the second slot 56 and adjacent the top surface 51 of the second substantially flat plate 50; and a second lock 76 located between the guides 57 and adjacent the bottom surface 54 of the second substantially flat plate 50.

As the two plates 30 and 50 are brought into contact and the angle gage 20 approaches being in its connected position, the teeth 74 in the first slot 37 of the first substantially flat plate 30 contact the second lock 76 between the guides 57 and adjacent to bottom surface 54 of the second plate 50. Concomitantly, the teeth 74 in the second slot 56 of the second substantially flat plate 50 contact the first lock 72 between the guides 38 and adjacent to top surface 31 of the first plate 30. First lock 72 and second lock 76 may a small peak placed perpendicular and connecting the guides 38 or 57. Once enough force is applied for the teeth 74 to pass over the first and second locks 72 and 76 respectively, the angle gage 20 is snapped or locked into its connected position. Depending on the malleability of the material used for the locks 72 and 76, teeth 74, and substantially flat plates 30 and 50, the force required to snap the substantially flat plates 30 and 50 into the connected position—and also to separate the angle gage 20 from its connected position into two separate plates—varies.

Although the first substantially flat plate 30 is shown connected to the second substantially flat 50 via the first slot 37 in the first substantially flat plate 30 and the second slot 56 in the second substantially flat plate 50, the first and second plates could be connected in any number of ways. For instance, the first substantially flat plate 30 could be connected to the second substantially flat plate via mechanical tabs, or via mechanical fasteners, such as nails, screws, or staples and the like. Alternatively, adhesive binding or the use of epoxy could be used to connect the first substantially flat plate 30 to the second substantially flat plate 50. In short, the first substantially flat plate 30 may be connected to the second substantially flat plate 50 in any number of ways known to one of ordinary skill in the art having the benefit of this disclosure could be used.

Figure 4:
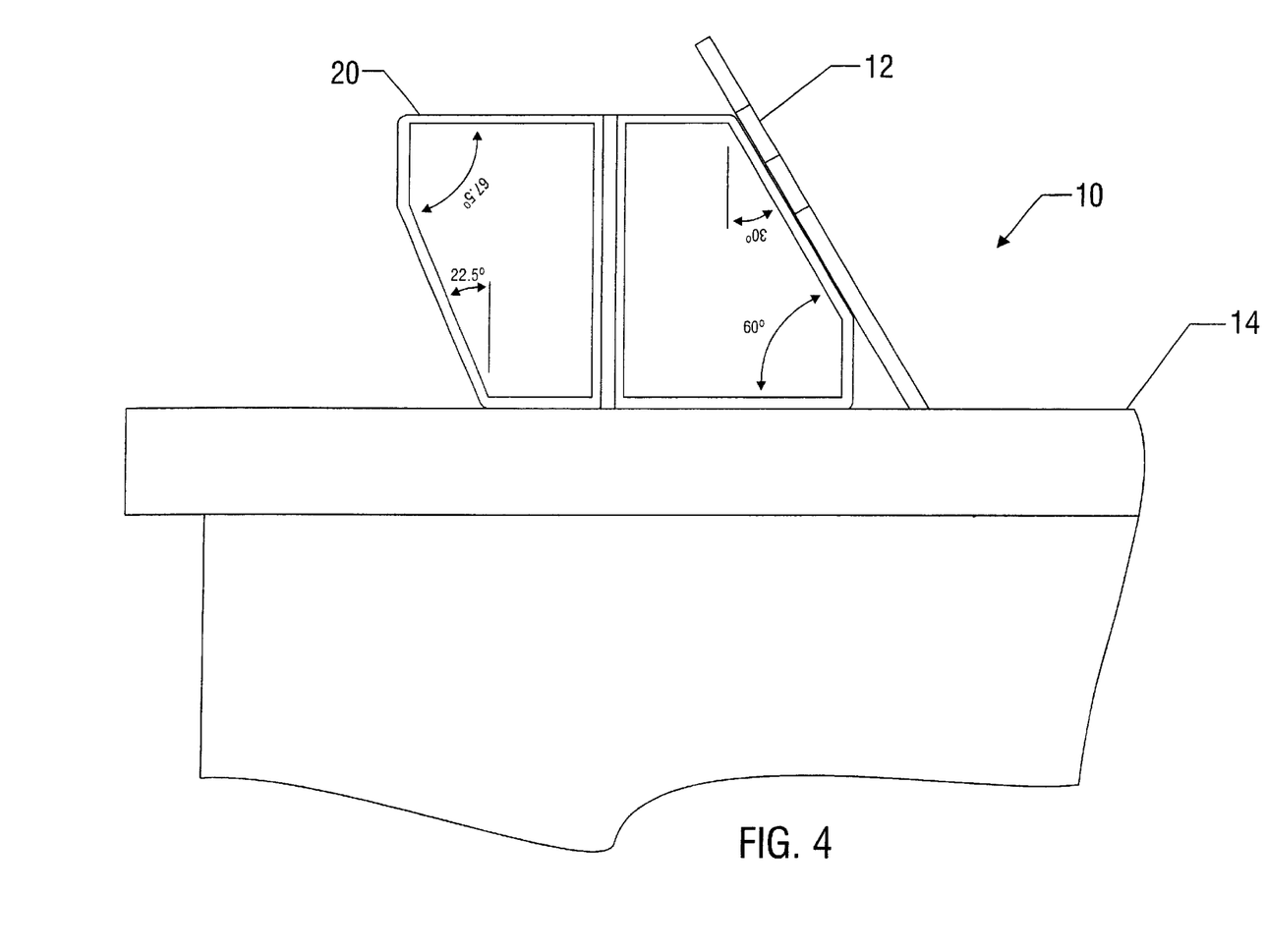
FIG. 4 shows an embodiment of the present invention being used in conjunction with a power tool.

Referring to FIG. 4, the angle gage 20 is shown being utilized to measure the angle formed by an adjustable element 12 relative to a reference surface 14 of a power tool 10. For example as discussed previously, the adjustable element 12 could be a table saw blade and the reference 14 could be the table saw table. To make an angled cut, the operator would unlock the blade from its locked position, adjust the angle of the blade (typically by rotating a shaft) until the blade reaches the desired position. The operator then locks the blade in this desired position. By using the free-standing angle gage 20, the operator may accurately perform these adjustments without the assistance from others.

It should be noted that it is not necessary that the reference surface 14 be planer, as shown, for the angle gage 20 is capable of resting on non-planer surfaces in some embodiments.

In operation, the free-standing angle gage 20 is placed on the reference surface 14 of the power tool 10. The side of the free-standing angle gage corresponding to the value of the desired angle of cut is placed toward the adjustable element, here the table saw blade. For instance, using the embodiment from FIGS. 1 and 2, if it is desired that the table saw blade be angled 60 degrees from the reference table, then the second side 34 of the first substantially flat plate 30 would be placed in the direction toward the table saw blade with the bottom surfaces 32 and 54 of the first and second substantially flat plates 30 and 50 contacting the reference plane, or the table saw table. The blade would be unlocked and adjusted until the blade contacted the second side 34 of the first substantially flat plate 30 (the desired angle) and the adjustable element 12 locked into place. In this way, the angle formed by an adjustable element 12 relative to a reference surface 14 of a power tool 10 may be quickly and accurately ascertained or changed. As shown in FIG. 2, because of the way the first substantially flat plate 30 is connected to the second substantially flat plate 50, the resulting angle gage 20 is self-supporting in a free-standing position which is advantageous when setting up a power tool.

Using the embodiments from FIGS. 1 and 2 as an example, if a 45 degree angle is desired, the free-standing angle gage 20 could be inverted (i.e. the top sides 31 and 51 of the first and second substantially flat plates of the angle gage 20 would contact the reference surface 14 of the power tool 10). The first side 52 of the second substantially flat plate 50 would be placed toward the adjustable element 12 of the power too 10, here the saw blade.

The operator may select the desired angle by reading the surface indicia, e.g. 84, 82, 86, or 55, for a quick reference of the value of the angles represented on the angle gage 20. In some embodiments, these surface indicia are present on both sides of the first and second substantially flat plates 30 and 50. A free-standing angle gage 20 having any desired value of the first angle 35, second angle 36, and third angle 53 could be produced for a particular application. The free-standing angle gage 20 described could be utilized to measure virtually any angle. For example, if it is desired to set up a power tool to produce a cut on a workpiece at 51 degrees, e.g., either the first 35, second 36, or third 53 angle could be changed to 51 degrees to produce a angle gage 20 appropriate for that particular application.

The embodiments shown simply represent common angles used in the power tool industry: 45 degrees, 67.5 degrees, and 60 degrees. Further, as various locations on the free-standing angle gage 20 have perpendicular corners, the squareness of an adjustable element 12 with a reference surface 14 may be quickly verified.

Figure 5:
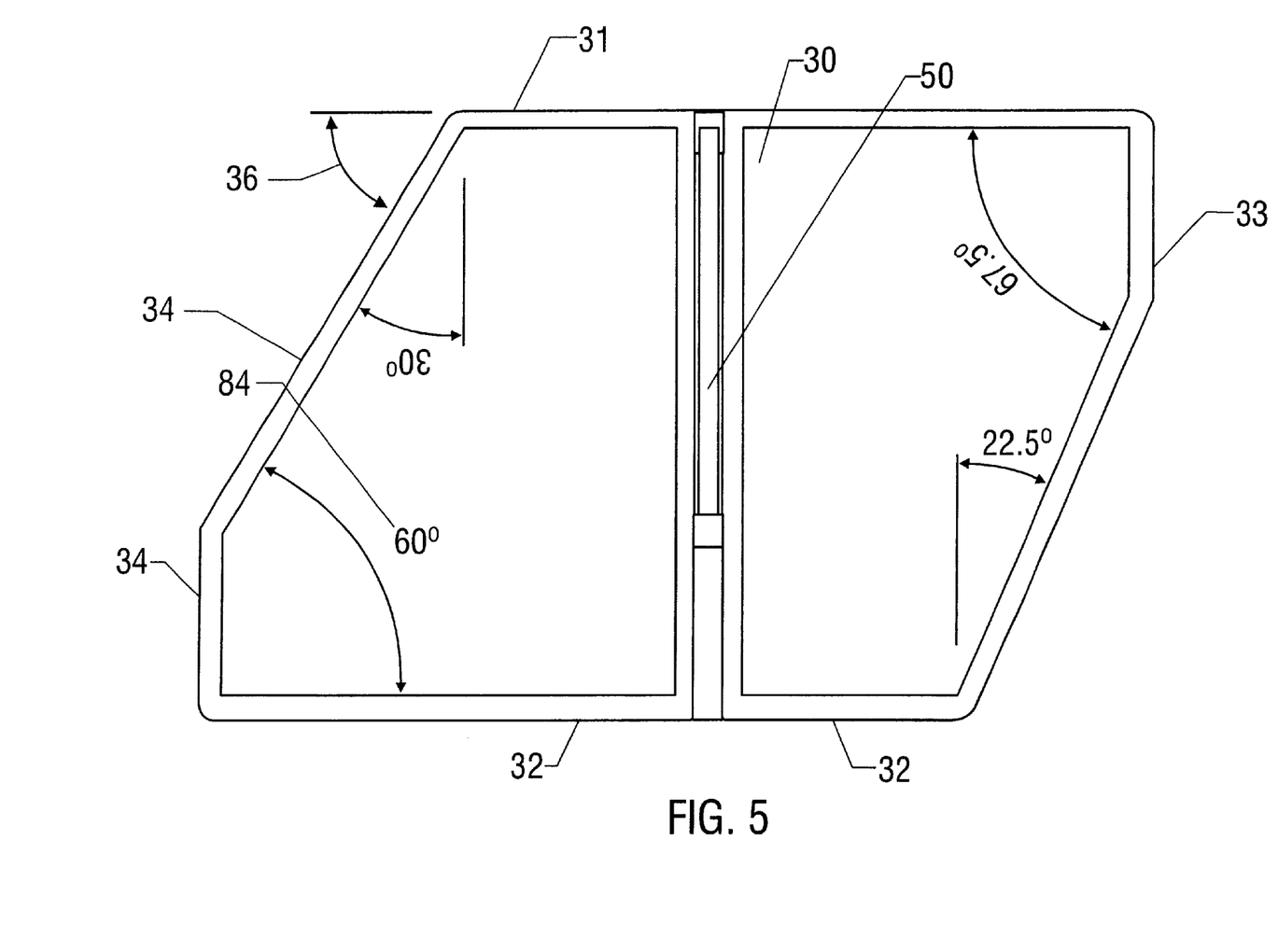
FIG. 5 front view of one embodiment of the present invention.
Figure 6:
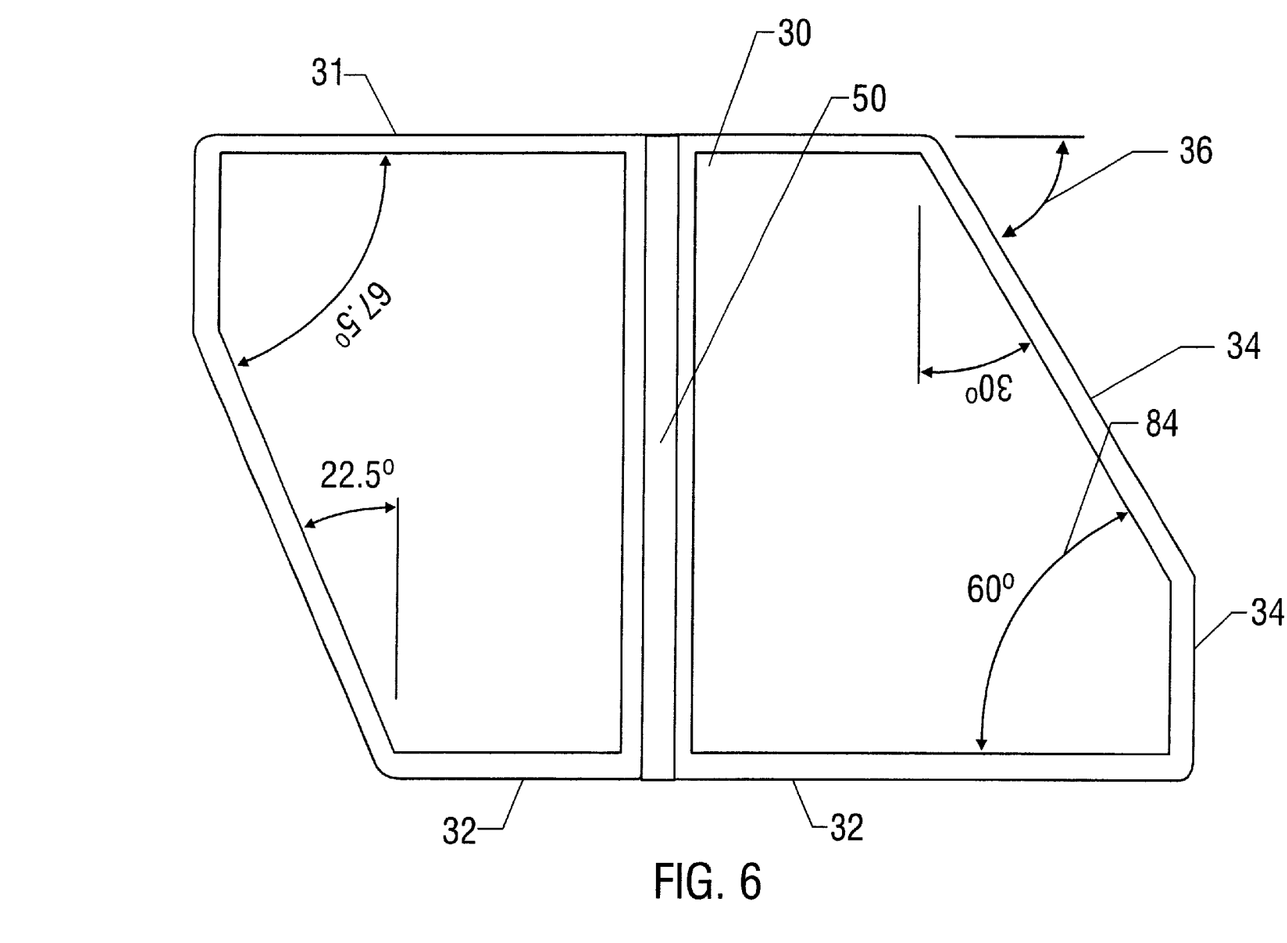
FIG. 6 is a rear view of one embodiment of the present invention.
Figure 7:
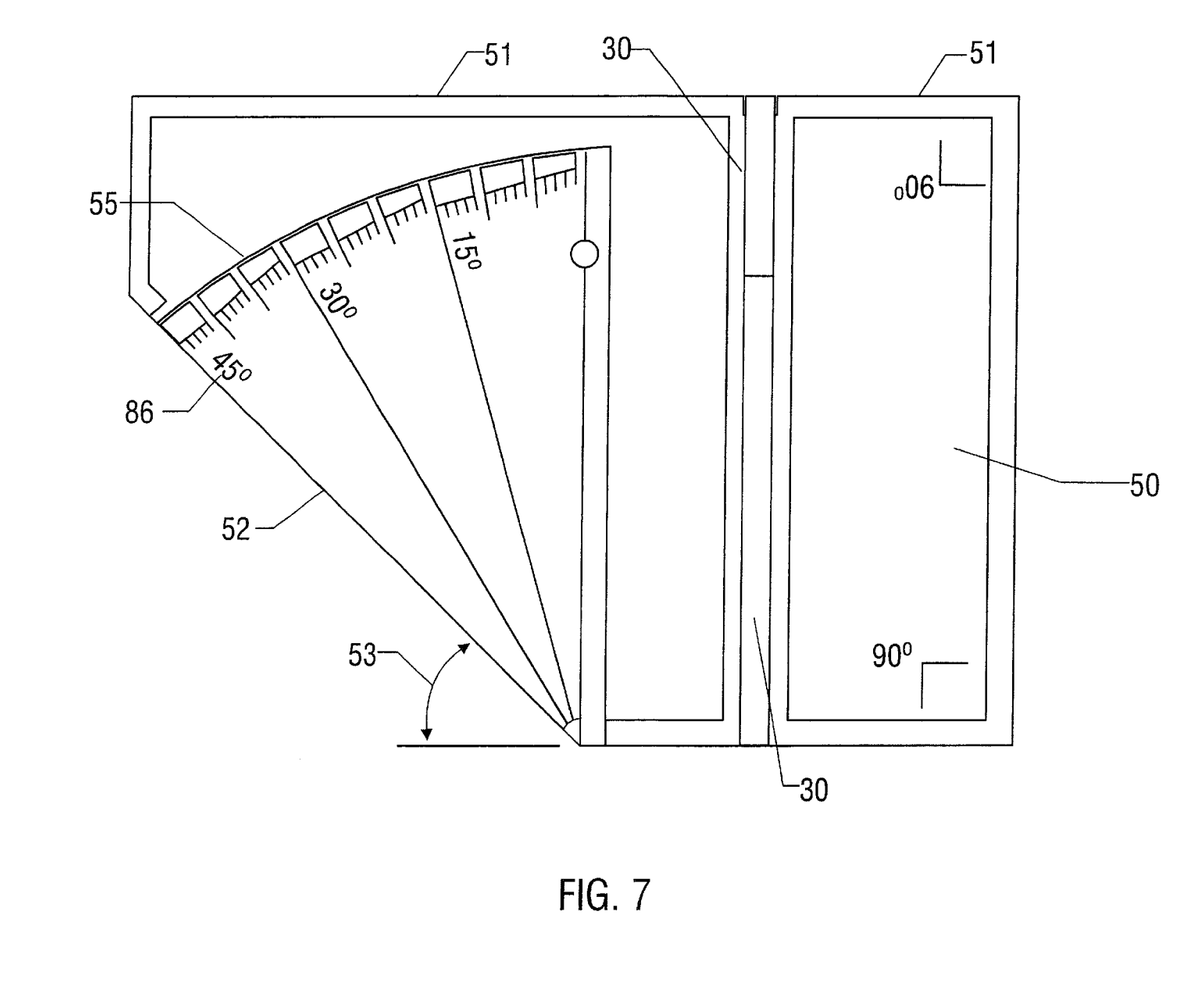
FIG. 7 is a left side view of one embodiment of the present invention.
Figure 8:
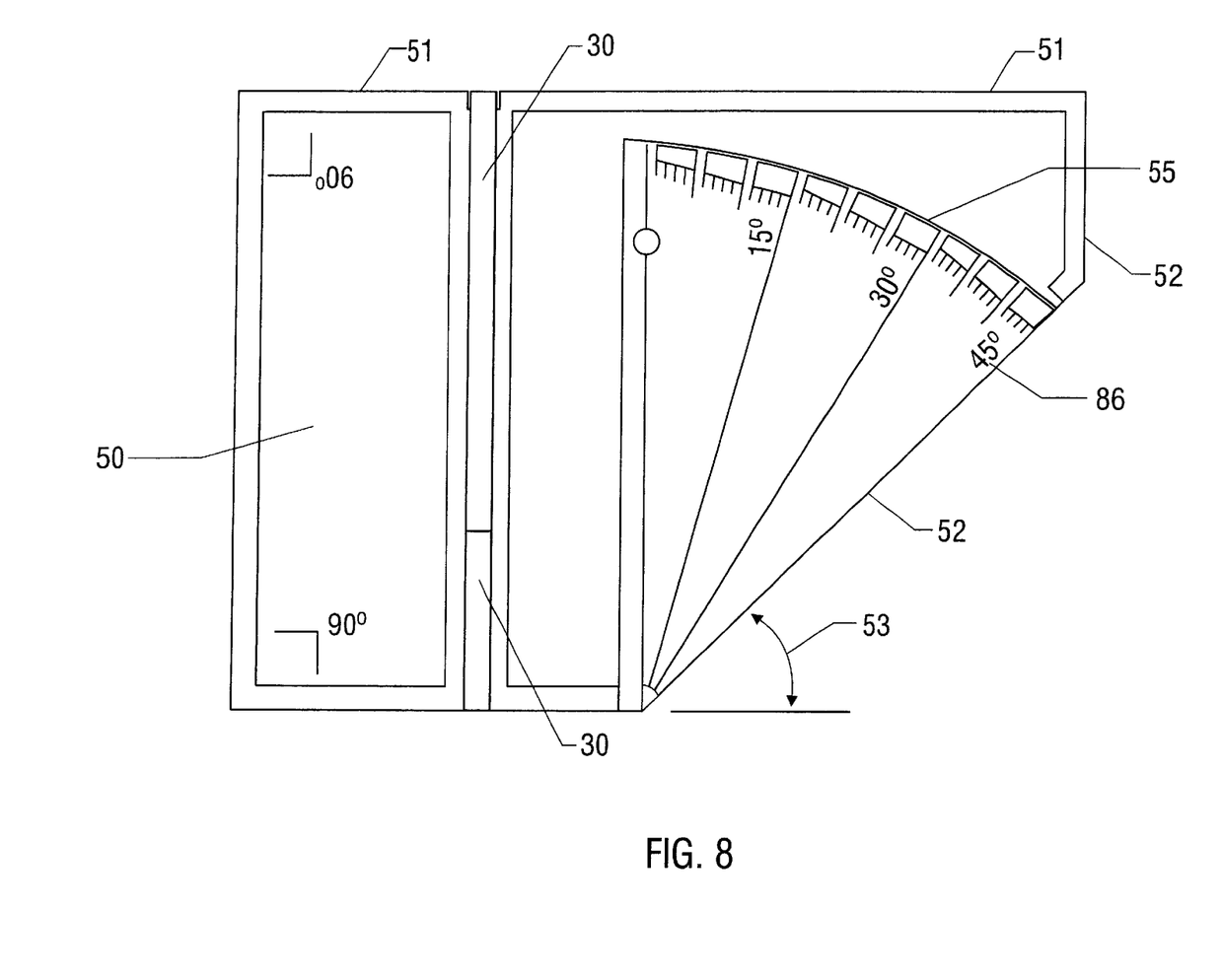
FIG. 8 is a right side view of one embodiment of the present invention.

Referring to FIG. 5, a front view of one embodiment of the free-standing angle gage 20 is shown in its connected position. FIG. 6 shows a rear view of one embodiment of the free-standing angle gage 20. FIG. 7 shows a left side view of one embodiment of the free-standing angle gage 20. FIG. 8 shows a right side view of one embodiment of the present invention.

Figure 9:
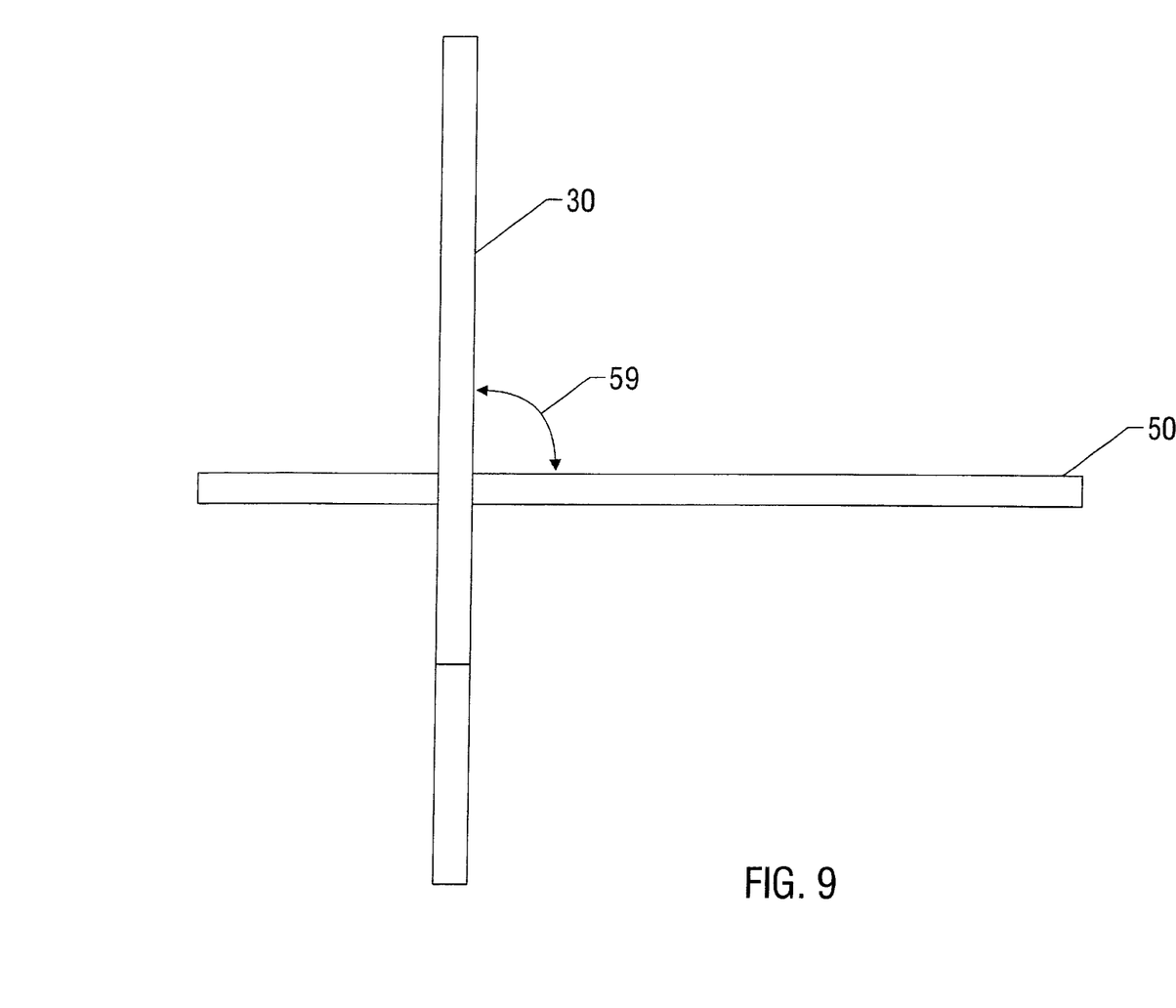
FIG. 9 is a top view of one embodiment of the present invention.
Figure 10:
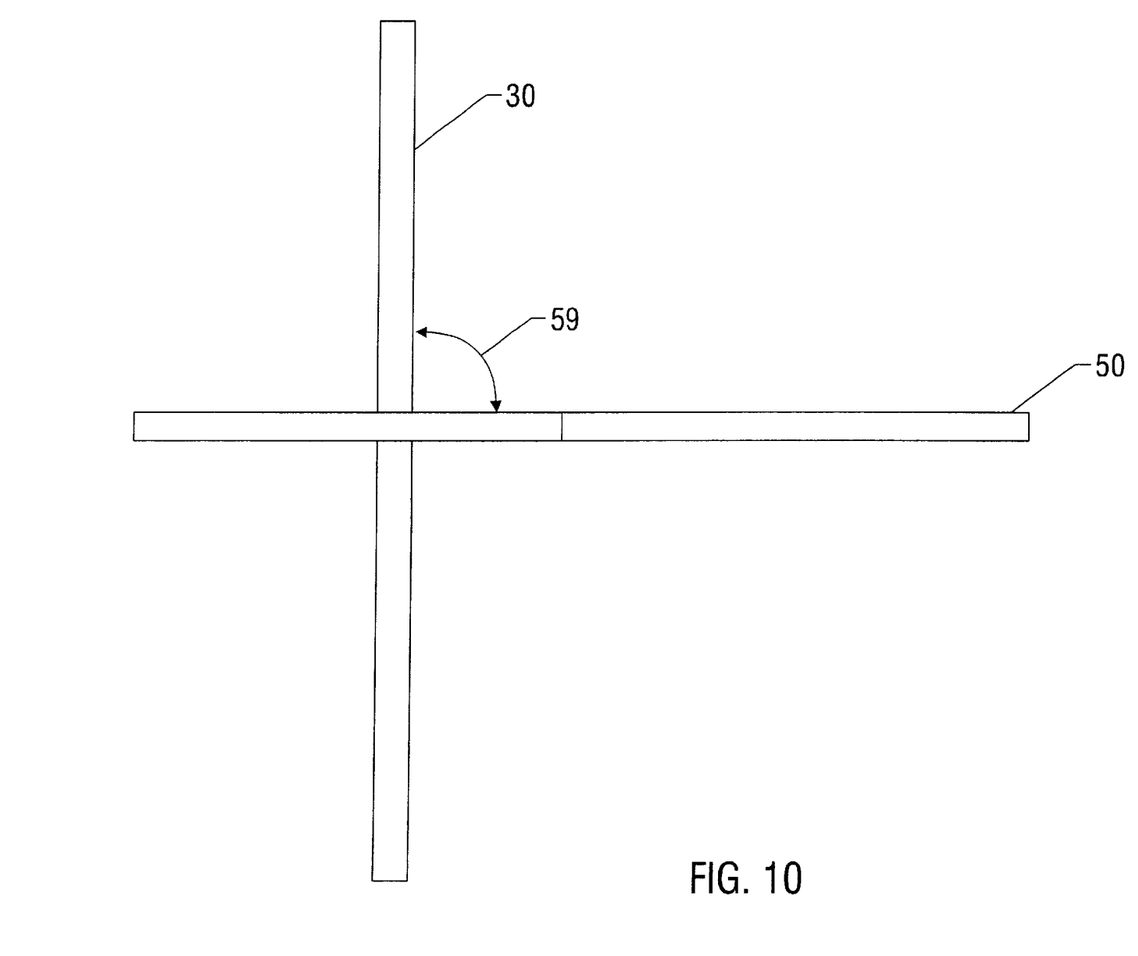
FIG. 10 is a bottom view of one embodiment of the present invention.

FIG. 9 shows a top view of one embodiment of the free-standing angle gage 20. Connecting angle 59 is shown in this embodiment to be 90 degrees. FIG. 10 shows a bottom view of one embodiment of the free-standing angle gage 20 having the connecting angle 59 of 90 degrees.

It should be noted that the reference numerals denoted in FIGS. 5–10 correspond with those previously described in FIGS. 1–4. It should also be noted that although the connecting angle 59 is 90 degrees in the embodiments shown in FIGS. 5–10, any value of connecting angle may be used such that the resulting angle gage 20 will remain free-standing as desired.

Although various embodiments have been shown and described, the invention is not so limited and will be understood to include all such modifications and variations as would be apparent to one skilled in the art.

The following table lists the description and the numbers as used herein and in the drawings attached hereto.

| Reference Designator | Name |
| --- | --- |
| 10 | Power Tool |
| 12 | Adjustable Element on a Power Tool |

-continued

| Reference Designator | Name |
| --- | --- |
| 14 | Reference Surface of Power Tool |
| 20 | Angle Gage |
| 30 | First Substantially Flat Plate |
| 31 | Top Surface of First Substantially Flat Plate |
| 32 | Bottom Surface of First Substantially Flat Plate |
| 33 | First Side of First Substantially Flat Plate |
| 34 | Second Side of First Substantially Flat Plate |
| 35 | First Angle |
| 36 | Second Angle |
| 37 | First Slot |
| 38 | Guide (on First Substantially Flat Plate) |
| 50 | Second Substantially Flat Plate |
| 51 | Top Surface of Second Substantially Flat Plate |
| 52 | First Side of Second Substantially Flat Plate |
| 53 | Third Angle |
| 54 | Bottom Surface of Second Substantially Flat Plate |
| 55 | Surface Indicia on Second Substantially Flat Plate |
| 56 | Second Slot |
| 57 | Guides (on Second Substantially Flat Plate) |
| 59 | Connecting Angle |
| 70 | Locking Mechanism |
| 72 | First Lock |
| 74 | Teeth |
| 76 | Second Lock |
| 80 | Surface Indicia on Second Substantially Flat Plate |
| 82 | Surface Indicia on First Substantially Flat Plate Corresponding to First Angle |
| 84 | Surface Indicia on First Substantially Flat Plate Corresponding to Second Angle |
| 86 | Surface Indicia on Second Substantially Flat Plate Corresponding to Third Angle |

What is claimed is:

1. A free-standing angle gage for measuring an angle formed by an adjustable element of a power tool relative to a reference surface, comprising:

a first substantially flat plate having a top surface, a bottom surface, a first side, and a second side, the top surface being parallel to the bottom surface, the first side forming a first angle with the bottom surface, the second side forming a second angle with the top surface; and a second substantially flat plate, the first substantially flat plate being connectable to the second substantially flat plate such that the resulting angle gage may stand alone when placed on the reference surface, wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

2. The free-standing angle gage of claim 1 in which the second substantially flat plate further comprises a bottom surface and a first side, the first side forming a third angle with the bottom surface of the second substantially flat plate.

3. The free-standing angle gage of claim 2 in which the third angle the first side of the second substantially flat plate forms with a bottom surface of the second substantially flat plate is 45 degrees.

4. The free-standing angle gage of claim 1 in which the second substantially flat plate further comprises surface indicia corresponding to a value of a third angle in degrees.

5. The free-standing angle gage of claim 1 in which the second substantially flat plate further comprises surface indicia adapted to facilitate measurement of the angle formed by the adjustable element of the power tool relative to the reference surface.

6. The free-standing angle gage of claim 5 in which the surface indicia on the second substantially flat plate comprises an angular scale measuring from 0 degrees to 45 degrees in one degree increments.

7. The free-standing angle gage of claim 1 further comprising:
the first substantially flat plate having a first slot perpendicular to the bottom surface of the first substantially flat plate,
the second substantially flat plate having a second slot perpendicular to a top surface of the second substantially flat plate,
the first slot mating with the second slot to interconnect the first substantially flat plate and the second substantially flat plate at a connecting angle.

8. The free-standing angle gage of claim 7 in which the connecting angle is 90 is degrees.

9. The free-standing angle gage of claim 7 further comprising:
the first slot has a guide on each side of the first slot, the guides running from the bottom surface to the top surface of the first substantially flat plate,
the second slot having a guide on each side of the second slot,
the guides of the second slot running from a bottom surface of the second substantially flat plate to the top surface of the second substantially flat plate,
the guides on the first and second substantially flat plate adapted to facilitate the mating of the first slot with the second slot.

10. The free-standing angle gage of claim 9 further comprising a locking mechanism to secure the first substantially flat plate to the second substantially flat plate.

11. The free-standing angle gage of claim 10 in which the locking mechanism further comprises:
a first lock being located between the guides on the first substantially flat plate, the first lock adjacent the top surface of the first substantially flat plate,
the slot on the first substantially flat plate having a set of teeth adjacent the bottom surface of the first substantially flat plate;
a second lock being located between the guides on the second substantially flat plate, the second lock adjacent the bottom surface of the second substantially flat plate,
the slot on the second substantially flat plate having a set of teeth adjacent the top surface of the second substantially flat plate,
the set of teeth on the slot on the first substantially flat plate contacting the second lock when the first and second substantially flat plates are interconnected,
the set of teeth on the slot on the second substantially flat plate contacting the first lock when the first and second substantially flat plates are interconnected,
to secure the first substantially flat plate to the second substantially flat plate.

12. The free-standing angle gage of claim 1 further comprising:
epoxy to mechanically bond the first substantially flat plate to the second substantially flat plate.

13. The free-standing angle gage of claim 1 further comprising:
mechanical tabs to connect the first substantially flat plate to the second substantially flat plate.

14. The free-standing angle gage of claim 1 in which the first substantially flat plate and the second substantially flat plate are integral, being formed from molded plastic.

15. The free-standing angle gage of claim 1 further comprising:
mechanical fasteners to connect the first substantially flat plate to the second substantially flat plate.

16. The free-standing angle gage of claim 1 in which the first side of the first substantially flat plate perpendicularly intersects the top surface of the first substantially flat plate.

17. The free-standing angle gage of claim 1 in which the second side of the substantially flat plate perpendicularly intersects the bottom surface of the first substantially flat plate.

18. The free-standing angle gage of claim 1 in which the first angle the first side of the first substantially flat plate forms with the bottom surface of the first substantially flat plate is 67.5 degrees.

19. The free-standing angle gage of claim 1 in which the second angle the second side of the first substantially flat plate forms with the top surface of the first substantially flat plate is 60 degrees.

20. The free-standing angle gage of claim 1 in which the first substantially flat plate further comprises surface indicia corresponding to a value of the first angle in degrees.

21. The free-standing angle gage of claim 1 in which the first substantially flat plate further comprises surface indicia corresponding to a value of the second angle in degrees.

22. The free-standing angle gage of claim 1 in which the first substantially flat plate further comprises surface indicia corresponding to a value of the first angle.

23. The fee-standing angle gage of claim 1 in which the first substantially flat plate further comprises surface indicia corresponding to a value of the second angle.

24. The free-standing angle gage of claim 1 in which the second substantially flat plate further comprises surface indicia corresponding to a value of a third angle.

25. The free-standing angle gage of claim 1 in which the first substantially flat plate further comprises surface indicia adapted to facilitate measurement of the angle formed by the adjustable element of the power tool relative to the reference surface.

26. A free-standing angle gage for measuring an angle formed by an adjustable element of a power tool relative to a reference surface, comprising:
a first substantially flat plate having a top surface, a bottom surface, a first side, and a second side, the top surface being parallel to the bottom surface, the first side forming a first angle of 67.5 degrees with the bottom surface, the first side of the first substantially flat plate perpendicularly intersecting the top surface of the first substantially flat plate, the first substantially flat plate having surface indicia having a value of 67.5 degrees corresponding to the first angle in degrees, the second side forming a second angle of 60 degrees with the top surface, the second side of the substantially flat plate perpendicularly intersecting the bottom surface of the first substantially flat plate, the first substantially flat plate having surface indicia corresponding to a value of 60 degrees, the first substantially flat plate having a first, slot perpendicular to the bottom surface of the first substantially flat plate; and
a second substantially flat plate having a bottom surface and a first side, the first side forming a third angle of 45 degrees with the bottom surface of the second substantially flat plate, the second substantially flat plate having surface indicia corresponding to a value of 45 degrees, the second substantially flat plate having surface indicia of an angular scale measuring from 0 degrees to 45 degrees in one degree increments adapted to facilitate measurement of the angle formed by the adjustable element of the power tool relative to the reference plane, the second substantially flat plate having a second slot perpendicular to a top surface of the second substantially flat plate, the first slot mating with the second slot to interconnect the first substantially flat plate and the second substantially flat plate at a connecting angle of 90 degrees, the first substantially flat plate being connectable to the second substantially flat plate such that the resulting angle gage may stand alone when placed on the reference surface, the guides on the first and second substantially flat plate defining a locking mechanism to secure the first slot with the second slot, the locking mechanism having a first lock being located between the guides on the first substantially flat plate, the first lock adjacent the top surface of the first substantially flat plate, the slot on the first substantially flat plate having a set of teeth adjacent the bottom surface of the first substantially flat plate, a second lock being located between the guides on the second substantially flat plate, the second lock adjacent the top surface of the second substantially flat plate, the slot on the second substantially flat plate having a set of teeth adjacent a bottom surface of the second substantially flat plate, the set of teeth on the slot on the first substantially plate contacting the second lock, the set of teeth on the slot on the second substantially flat plate contacting the first lock, to secure the first substantially flat plate to the second substantially flat plate, wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

27. A method of determining an angle formed by an adjustable element of a power tool relative to a reference surface, the method comprising:

providing a power tool having a reference plate and an adjustable element;

providing a free-standing angle gage having a first substantially flat plate having a top surface, a bottom surface, a first side, and a second side, the top surface being parallel to the bottom surface, the first side forming a first angle with the bottom surface, the second side forming a second angle with the top surface, and a second substantially flat plate having a top surface and a first side, the first side forming a third angle with the top surface of the second substantially flat plate, the first substantially flat plate being connectable to the second substantially flat plate such that the resulting angle gage may stand alone when placed on the reference surface;

placing the angle gage onto the reference surface of the power tool; and adjusting the adjustable element until the adjustable element selectively contacts the first side of the first substantially flat plate, the second side of the first substantially flat plate, and the first side of the second substantially flat plate to determine the angle formed by the adjustable element relative to the reference plane.

28. The method of claim 27 in which the step of providing a free standing angle gage further comprises:

providing the angle gage in which the first substantially flat plate has a first slot perpendicular to the bottom surface of the first substantially flat plate, the second substantially flat plate having a second slot, the first slot mating with the second slot to interconnect the first substantially flat plate and the second substantially flat plate at a connecting angle.

29. A free-standing angle gage for measuring an angle formed by an adjustable element of a power tool relative to a reference surface, comprising:

a first substantially flat plate having a top surface, a bottom surface, a first side, and a second side, the top surface being parallel to the bottom surface, the first side forming a first angle with the bottom surface, the second side forming a second angle with the top surface; and a second substantially flat plate having a bottom surface, and a first side, the first side forming a third angle with the bottom surface, the first substantially flat plate being connectable to the second substantially flat plate such that the resulting angle gage may stand alone when placed on the reference surface, wherein a selected one of the top surface and bottom surface of the first substantially flat plate, or the bottom surface of the second substantially flat plate is placed on the reference surface, and a selected one of the first and the second sides of the first substantially flat plate or the first side of the second substantially flat plate is placed proximate the adjustable element to determine the angle formed by the adjustable element relative to the reference surface.

30. The free-standing angle gage of claim 29 in which the second substantially flat plate further comprises surface indicia adapted to facilitate measurement of the angle formed by the adjustable element of the power tool relative to the reference surface.

31. The free-standing angle gage of claim 30 in which the surface indicia on the second substantially flat plate comprises an angular scale measuring from 0 degrees to 45 degrees in one degree increments.

32. The free-standing angle gage of claim 29 further comprising:

the first substantially flat plate having a first slot perpendicular to the bottom surface of the first substantially flat plate, the second substantially flat plate having a second slot perpendicular to a top surface of the second substantially flat plate, the first slot mating with the second slot to interconnect the first substantially flat plate and the second substantially flat plate at a connecting angle.

33. The free-standing angle gage of claim 32 in which the connecting angle is 90 degrees.

34. The free-standing angle gage of claim 32 further comprising:

the first slot has a guide on each side of the first slot, the guides running from the bottom surface to the top surface of the first substantially flat plate, the second slot having a guide on each side of the second slot, the second slot running from a bottom surface of the second substantially flat plate to the top surface of the second substantially flat plate, the guides on the first and second substantially flat plate adapted to facilitate the mating of the first slot with the second slot.

35. The free-standing angle gage of claim 34 further comprising a locking mechanism to secure the first substantially flat plate to the second substantially flat plate.

36. The free-standing angle gage of claim 35 in which the locking mechanism further comprises:
  a first lock being located between the guides on the first substantially flat plate, the first lock adjacent the top surface of the first substantially flat plate,
  the slot on the first substantially flat plate having a set of teeth adjusting the surface of the first substantially flat plate;
  a second lock being located between the guides on the second substantially flat plate, the second lock adjacent the bottom surface of the second substantially flat plate,
  the slot on the second substantially flat plate having a set of teeth adjacent the top surface of the second substantially flat plate,
  the set of teeth on the slot on the first substantially flat plate contacting the second lock when the first and second substantially flat plates are interconnected,
  the set of teeth on the slot on the second substantially flat plate contacting the first lock when the first and second substantially flat plates are interconnected,
  to secure the first substantially flat plate to the second substantially flat plate.

37. The free-standing angle gage of claim 29 further comprising:
  epoxy to mechanically bond the first substantially flat plate to the second substantially flat plate.

38. The free-standing angle gage of claim 29 further comprising:
  mechanical tabs to connect the first substantially flat plate to the second substantially flat plate.

39. The free-standing angle gage of claim 29 in which the first substantially flat plate and the second substantially flat plate are integral, being formed from molded plastic.

40. The free-standing angle gage of claim 29 further comprising;
  mechanical fasteners to connect the first substantially flat plate to the second substantially flat plate.

41. The free-standing angle gage of claim 29 in which the first side of the first substantially flat plate perpendicularly intersects the top surface of the first substantially flat plate.

42. The free-standing angle gage of claim 29 in which the second side of the substantially flat plate perpendicularly intersects the bottom surface of the first substantially flat plate.

43. The free-standing angle gage of claim 29 in which the first angle the first side of the first substantially flat plate forms with the bottom surface of the first substantially flat plate is 67.5 degrees.

44. The fee-standing angle gage of claim 29 in which the second angle the second side of the first substantially flat plate forms with the top surface of the first substantially flat plate is 60 degrees.

45. The free-standing angle gage of claim 29 in which the third angle the first side of the second substantially flat plate forms with a bottom surface of the second substantially flat plate is 45 degrees.

46. The free-standing angle gage of claim 29 in which the first substantially flat plate further comprises surface indicia corresponding to a value of the first angle in degrees.

47. The free-standing angle gage of claim 29 in which the first substantially flat plate further comprises surface indicia corresponding to a value of the second angle in degrees.

48. The free-standing angle gage of claim 29 in which the second substantially flat plate further comprises surface indicia corresponding to a value of the third angle in degrees.

49. The free-standing angle gage of claim 29 in which the first substantially flat plate further comprises surface indicia adapted to facilitate measurement of the angle formed by the adjustable element of the power tool relative to the reference surface.

50. A free-standing angle gage for measuring an angle formed by an adjustable element of a power tool relative to a reference surface, comprising:
  a first substantially flat plate having a top surface, a bottom surface, a first side, and a second side, the top surface being parallel to the bottom surface, the first side forming a first angle with the bottom surface, the second side forming a second angle with the top surface; and
  a second substantially flat plate having surface indicia adapted to facilitate measurement of the angle formed by the adjustable element of the power tool relative to the reference surface,
    the first substantially flat plate being connectable to the second substantially flat plate such that the resulting angle gage may stand alone when placed on the reference surface,
    wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

51. The free-standing angle gage of claim 50 in which the surface indicia on the second substantially flat plate comprises an angular scale measuring from 0 degrees to 45 degrees in one degree increments.

52. A free-standing angle gage for measuring an angle formed by an adjustable element of a power tool relative to a reference surface, comprising:
  a first substantially flat plate having a top surface, a bottom surface, a first side, a second side, and surface indicia adapted to facilitate measurement of the angle formed by the adjustable element of the power tool relative to the reference surface, the top surface being parallel to the bottom surfaces the first side forming a first angle with the bottom surface, the second side forming a second angle with the top surface; and
  a second substantially flat plate, the first substantially flat plate being connectable to the second substantially flat plate such that the resulting angle gage may stand alone when placed on the reference surface,
    wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

53. A free-standing angle gage for measuring an angle formed by an adjustable element of a power tool relative to a reference surface, comprising:
  a first substantially flat plate having a top surface, a bottom surface, a first side, and a second side, the top surface being parallel to the bottom surface, the first side forming a first angle with the bottom surface, the second side forming a second angle with the top surface, the first substantially flat plate having surface indicia corresponding to a value of the first angle in degrees; and a second substantially flat plate, the first substantially flat plate being connectable to the second substantially flat plate such that the resulting angle gage may stand alone when placed on the reference surface, wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

54. A free-standing angle gage for measuring an angle formed by an adjustable element of a power tool relative to a reference surface, comprising:

a first substantially flat plate having a top surface, a bottom surface, a first side, and a second side, the top surface being parallel to the bottom surface, the first side forming a first angle with the bottom surface, the second side forming a second angle with the top surface, the first substantially flat plate having surface indicia corresponding to a value of the second angle in degrees; and a second substantially flat plate, the first substantially flat plate being connectable to the second substantially flat plate such that the resulting angle gage may stand alone when placed on the reference surface, wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

55. A free-standing angle gage for measuring an angle formed by an adjustable element of a power tool relative to a reference surface, comprising:

a first substantially flat plate comprising:
  a top surface;
  a bottom surface, the top surface being parallel to the bottom surface;
  a first side, the first side forming a first angle with the bottom surface;
  a second side, the second side forming a second angle with the top surface; and
  a first slot perpendicular to the bottom surface, the first slot having a guide on each side and a set of teeth adjacent the bottom surface, the guides running from the bottom surface to the top surface, wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface;

a second substantially flat plate comprising:
  a top surface;
  a bottom surface; and
  a second slot perpendicular to the top surface, the second slot having a guide on each side and a set of teeth adjacent the top surface, the guides running from the bottom surface to the top surface, the guides on the first and second substantially flat plate being adapted to facilitate mating of the first slot with the second slot to interconnect the first substantially flat plate and the second substantially flat plate at a connecting angle such that the resulting angle gage may stand alone when placed on the reference surface; and a locking mechanism securing the first substantially flat plate to the second substantially flat plate, the locking mechanism comprising:
  a first lock being located between the guides on the first substantially flat plate, the first lock adjacent the top surface of the first substantially flat plate; and
  a second lock being located between the guides on the second substantially flat plate, the second lock adjacent the bottom surface of the second substantially flat plate, wherein when the first and second substantially flat plates are interconnected the set of teeth on the first slot of the first substantially flat plate contact the second lock, and the set of teeth on the second slot of the second substantially flat plate contact the first lock, securing the first substantially flat plate to the second substantially flat plate.

56. A free-standing angle gage for measuring an angle formed by an adjustable element of a power tool relative to a reference surface, comprising:

a first substantially flat plate having a top surface, a bottom surface, a first side, and a second side, the top surface being parallel to the bottom surface, the first side forming a first angle with the bottom surface, the second side forming a second angle with the top surface; and a second substantially flat plate comprising surface indicia corresponding to a value of a third angle in degrees,
  the first substantially flat plate being connectable to the second substantially flat plate such that the resulting angle gage may stand alone when placed on the reference surface,
  wherein a selected one of the top surface and bottom surface of the first substantially flat plate is placed on the reference surface, and a selected one of the first and the second sides of the first substantially flat plate is placed proximate the adjustable element to determine the angle formed by the adjustable element relative to the reference surface.

57. The free-standing angle gage of claim 56 in which the second substantially flat plate further comprises a bottom surface and a first side, the first side forming the third angle with the bottom surface of the second substantially flat plate.

* * * * *